United States Patent [19]

Kreitzberg

[11] 4,116,459
[45] Sep. 26, 1978

[54] SAFETY LOCK FOR ARTICULATED JOINT ON VEHICLE

[75] Inventor: Ernest A. Kreitzberg, Mukwonago, Wis.

[73] Assignee: Allis-Chalmers Corporation, Milwaukee, Wis.

[21] Appl. No.: 755,933

[22] Filed: Dec. 30, 1976

[51] Int. Cl.² .............................................. B62D 53/00
[52] U.S. Cl. ..................................... 280/474; 180/138
[58] Field of Search ........... 280/474, 445, 432, 446 B; 180/138, 136, 135

[56] References Cited

U.S. PATENT DOCUMENTS

| | | | |
|---|---|---|---|
| 3,521,720 | 7/1970 | Korotkin | 180/136 X |
| 3,612,575 | 10/1971 | Stewart | 280/474 |
| 3,680,890 | 8/1972 | Magown | 280/474 X |
| 3,717,215 | 2/1973 | Nigg et al. | 280/474 X |
| 3,815,939 | 6/1974 | Pettay | 280/474 |
| 3,910,355 | 10/1975 | Elfes | 280/474 X |
| 3,912,300 | 10/1975 | Bryan | 280/492 X |

Primary Examiner—John A. Pekar
Attorney, Agent, or Firm—Arthur L. Nelson

[57] ABSTRACT

A locking link for locking the articulating joint on an articulating vehicle. The link has a locking position which locks the articulating joint on the vehicle and a rest position where the link is in a vertical rest position carried on only one of the bogies of an articulating vehicle.

9 Claims, 5 Drawing Figures

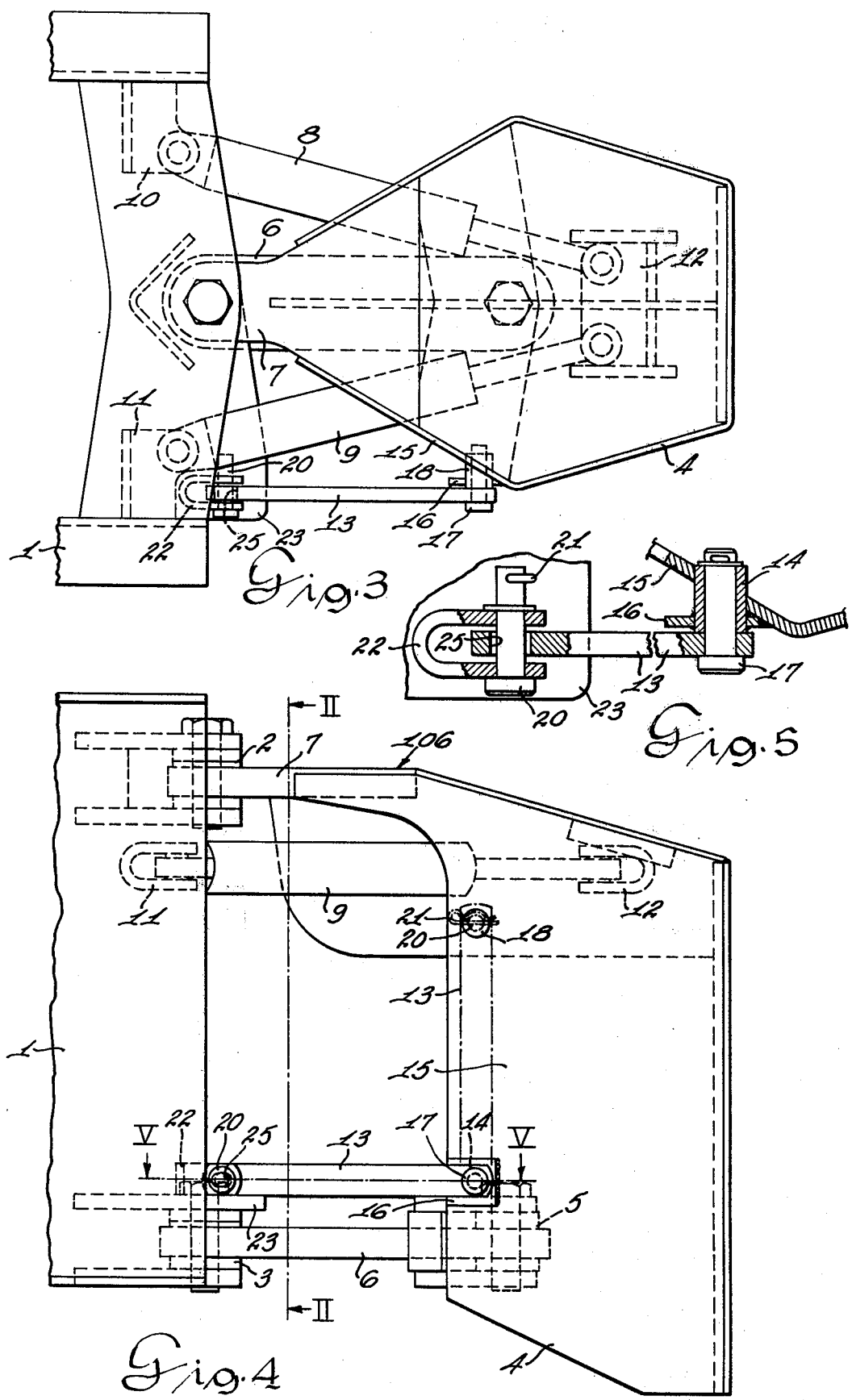

SAFETY LOCK FOR ARTICULATED JOINT ON VEHICLE

This invention relates to an articulating vehicle and more particularly to a locking link for locking the articulating joint of an articulating vehicle in which the link connects the two bogies of the articulated vehicle through a link offset from the center line of the vehicle. The link also has a rest position in which the link is pivoted vertically and carried on a single bogie which allows the vehicle to pivot freely on the articulating joint.

Articulating vehicles have articulated bearings which pivotally connect the front bogie with the rear bogie of the vehicle. Usually these vehicles are steered with a pair of hydraulic actuators mounted on either side of the vehicle in which the one hydraulic actuator extends while the other contracts to pivot the vehicle for left-hand or right-hand steering in response to the steering control valve in operating the hydraulic system. The pivoting of the articulating bearing is controlled through hydraulic means and so long as there is power driving the pump in the hydraulic system, the pressurized fluid controls the pivoting of the vehicle on the articulating joint. When the power is turned off, however, the fluid is not pressurized in the hydraulic system and the steering mechanism may be allowed to creep thereby permitting articulation of the vehicle. Usually articulating vehicles include large frames on the front and rear bogies, the movement of which a person would be unable to control if there was no power on the vehicle. Accordingly, as a safety precaution, the articulating joint should be locked when the vehicle is in parked position. This is particularly necessary if the vehicle is on an incline. Also when the vehicle is being transported, a locking means for the articulating joint is necessary so the vehicle does not shift. The center of the vehicle has a tendency to shift out of line when the flat car or the truck carrying the vehicle is going around a curve or is being suddenly started or stopped.

Accordingly, this invention provides for a link which is pivotally supported on one bogie and can be pivoted to a vertical rest position on this same bogie when the vehicle is in operation and the articulating joint is normally pivoting as the vehicle is steered. When, however, it is desired to lock the articulating joint, the link pin can be removed and positioned through a clevis on the other bogie and through the link to lock the two bogies of the vehicle to prevent articulation of the vehicle. The link is carried on the vehicle in a locking position or the rest position, but always carried on the vehicle so it is available whenever needed.

Accordingly, it is an object of this invention to provide a lock for the articulating joint in an articulating vehicle.

It is another object of this invention to provide a link for locking all the bearings of an articulated vehicle by a link pivotally mounted parallel with the longitudinal center line of the vehicle and on the side of the vehicle.

It is a further object of this invention to provide a locking link for locking the articulating bearings of an articulated vehicle in the operating position and a rest position where the link is carried in the vertical position on one of the bogies of the vehicle which permits the vehicle to articulate normally.

The objects of this invention are accomplished by providing a link pivotally connected to the frame of one of the bogies of an articulated vehicle and pivotally connected to the frame of the other bogie of the vehicle to lock the articulating joints and preventing them from articulating. The link may be pivoted to the vertical rest position on the frame of the one bogie and in this position, the vehicle is allowed to freely articulate. The link is carried in the rest position and always available on the vehicle whenever needed. A single or a double link may be used on the vehicle. If two links are used on the vehicle, each would be placed on opposing sides of the vehicle.

Referring to the drawings, the preferred embodiment of the invention is illustrated in which:

FIG. 3 is a plan view of the articulating joint and the locking link;

FIG. 4 is a side elevation view of the articulating bearings and the locking link; and FIG. 5 is an enlarged section taken through the mounting pin.

Figure 1:
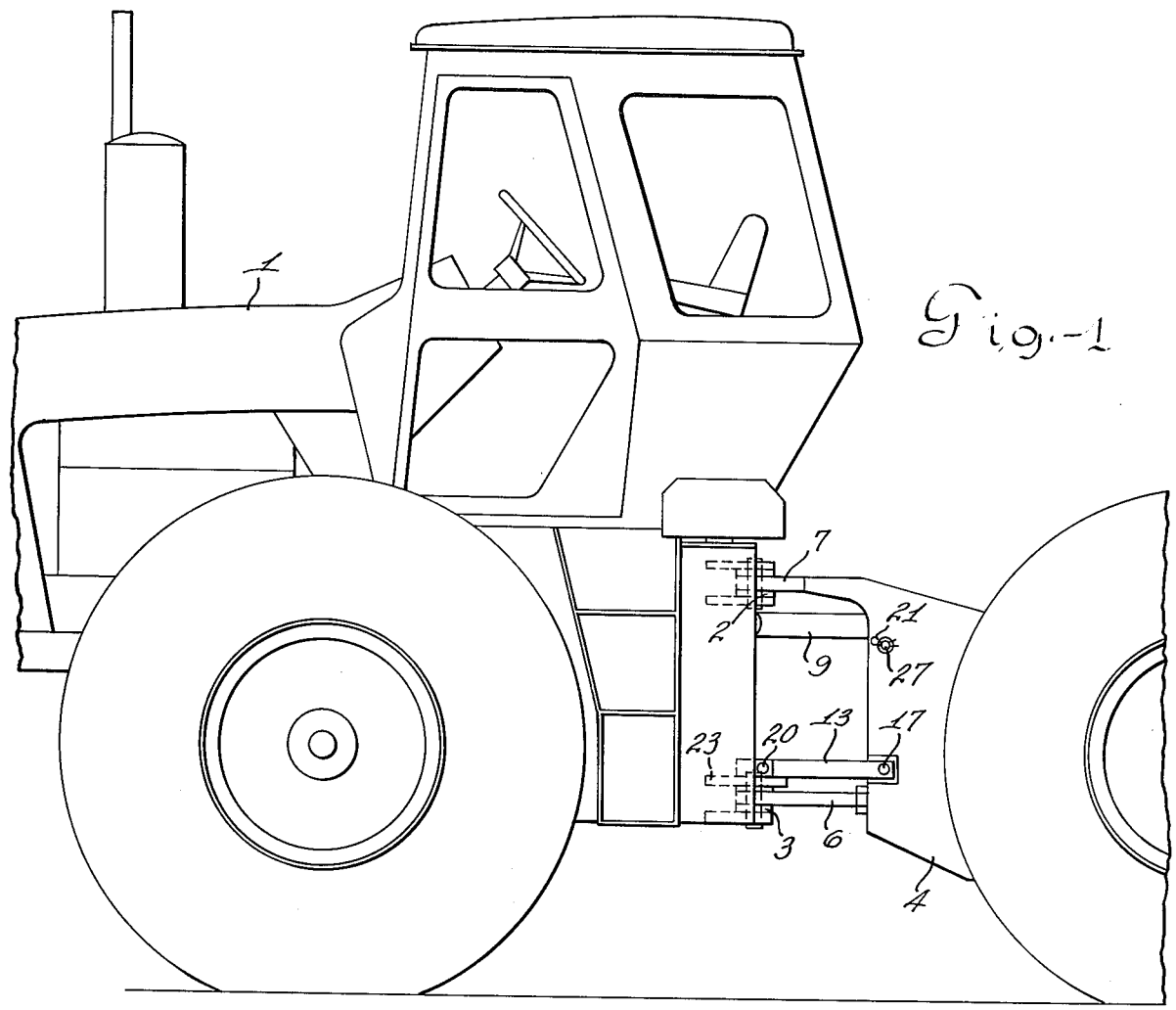
FIG. 1 illustrates a side elevation view of an articulated vehicle.

Referring to the drawings, FIG. 1 illustrates the articulating tractor. The front bogie 1 is pivotally connected, as shown in FIG. 4, by the articulating bearings 2 and 3 to the rear bogie 4. A third bearing 5 is also shown in FIG. 3. The bearings are primarily intended to pivot in an articulated manner, but permit a degree of roll between the two bogies since the bearings are spherical bearings to compensate for uneven terrain.

The bearing 2 and the bearing 3 are axially aligned on a vertical axis. The link 6 extends rearwardly and is pivotally connected to the bearing 5 on the rear bogie 4. A rear frame 106 extends upwardly and forwardly to form the arm 7 to pivotally connect through the articulating bearing 2.

During the normal steering operation, the steering cylinders 8 and 9 articulate the vehicle. The steering cylinders are connected in a hydraulic system with a steering control valve to selectively extend or contract the cylinders for left or right turn steering. The cylinder 8 is pivotally mounted on the bracket 10, while the steering cylinder 9 is pivotally mounted on the bracket 11 on the front bogie. The steering cylinders 8 and 9 are also pivotally connected to the plate 12 which is mounted on the rear bogie.

As the vehicle articulates, the angularity between the center lines of the front and rear bogies change from the normal coincidental alignment of center lines when the vehicle is traveling straight ahead. As the angularity of the longitudinal center lines of the front and rear bogie changes, the distance between points on the side of each frame transversely from the longitudinal center lines either shorten or lengthen. Accordingly, the link 13 in the locking position is designed to maintain a fixed dimension between points on the lateral portions of the frame and prevent articulation.

FIG. 5 is a cross-section view taken through the pin 17 with the pin in the sleeve 14. The sleeve 14 is welded to the frame 15. A reinforcing loop 16 encircles the sleeve 14 and is welded to the frame and sleeve to provide rigidity for the mounting for the pin 17. The pin 17 provides a pivot for the link 13. The sleeve 18 is also fabricated to the frame 15.

Figure 2:
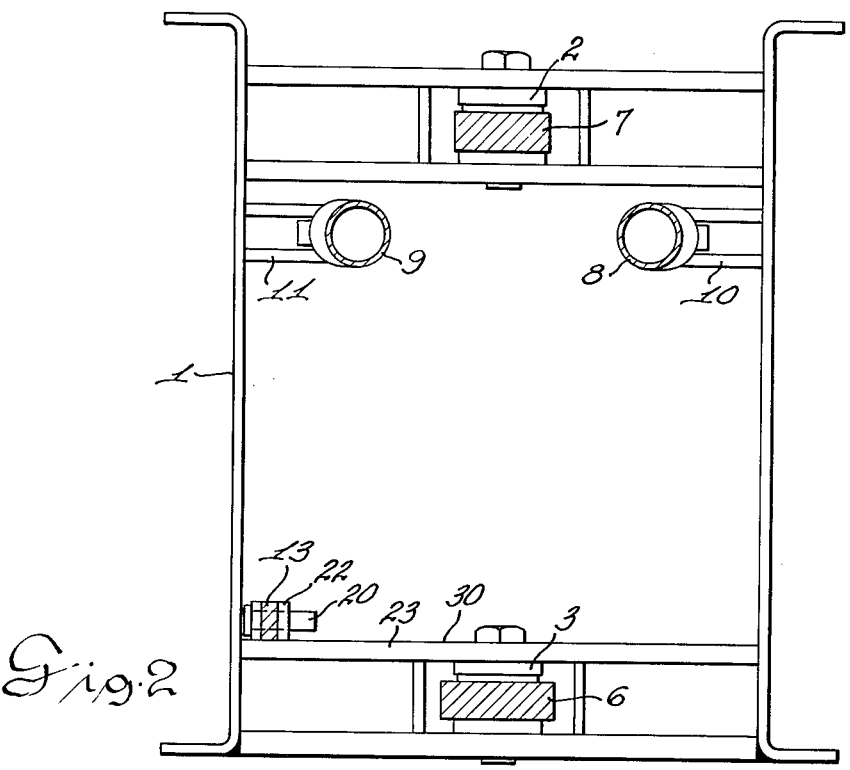
FIG. 2 is a cross-section view of the articulating bearing and the locking link taken along line II—II of FIG. 4.

The link 13 is shown in the locking position when it is horizontally positioned as shown in FIG. 3. The phantom view shows the link 13 in the vertical or rest position. The key 21 is shown in the keyed position of pin 27 when the link is in the rest position. Normally, when the vehicle is in operation, the link 13 is in the rest position as shown in the phantom view of FIG. 4. When the vehicle is in transport or is in the park position, it is preferable to place the link 13 in the locking position which is shown in FIG. 4 with the link in the horizontal position. In this position, a clevis 22 which is welded to the plate 23 will receive the link 13 as shown in FIGS. 3 and 4. When the link 13 is in the horizontal position shown in FIGS. 3 or 4, the link rests on the plate 23. The oblong hole 25 permits a slight movement between front and rear bogies to facilitate connection of the link with the clevis by insertion of the pin 20. When the pin is inserted through the clevis 22 and the link 13 as shown in FIG. 2, the pin is keyed to hold the link in the locking position.

The operation of this device will be described in the following paragraphs.

Referring to FIG. 4, the link 13 is shown in the rest position when the link is vertically positioned as shown in the phantom view. Pin 17 pivotally supports the lower end of the link 13. The sleeve 14 mounted in the frame 15 retains the link in a pivotal position for selective movement to the vertical rest position or the horizontal locking position. The vertical or rest position is used when the vehicle is in operation and the articulating joints are articulating as the vehicle is steered. In this position, the link is always available on the tractor if it is needed. The link is in a position which presents no inconvenience to the operator and is always ready for use when necessary. The pin 27 carrying key 21 is also positioned in the sleeve 18 so that they are available when the link is needed for locking the articulating joint.

When it is necessary to lock the articulating joint, the link 13 is pivoted downward until it engages the surface 30 of the plate 23. Normally when the vehicle is steered straight ahead, the link can be rested on the surface 30 and the elongation of the oblong hole 25 is adequate to allow for positioning the pin in the hole when the operator steps down from the vehicle. Any slight change in the positioning of the two bogies to align the hole which may be required due to unevenness in the terrain can be made by allowing a pin to rest on the surface 30 and make a slight steering movement of the vehicle to facilitate alignment of the pin in the hole and then inserting the key 21 to lock the articulating joints. The link 13 is being positioned laterally from the longitudinal center lines of bogies 1 and 4 and prevents the articulating joints from operating. Once the locking link 13 is in place, the vehicle is restrained from articulation.

The embodiments of the invention in which an exclusive property or privilege is claimed are defined as follows:

1. An articulating vehicle having a locking link for locking an articulating joint of the vehicle comprising, a bogie of an articulating vehicle, another bogie of the articulating vehicle, at least one articulating joint pivotally connecting said bogies of said vehicle, including an upper and a lower vertically aligned articulated bearings defining an articulating axis with one of said bearings pivotally connecting said bogies, an articulating link connected to the other of said bearings with a third bearing defining another articulating axis pivotally connecting said bogies, at least two of said bearings defining spherical bearings, a locking link, a pivotal joint defining a horizontal axis pivotally connecting a pivotal end of said link to one of said bogies of said articulating vehicle, a swingable end on said locking link defining a hole, a pin support defining a horizontal opening mounted on said one bogie of said vehicle for receiving the swingable end of said locking link for defining the rest position of said locking link, a pin for reception in said hole in said locking link and the opening of said pin support in the rest position, a pin mounting means defining a horizontal pin opening mounted on the other of said bogies of said vehicle for selectively receiving said swingable end of said locking link, said pin selectively received in said pin mounting means and said swingable end of said locking link when said locking link is in the locking position to thereby lock said pin and said locking link when said locking link is in the locking position for locking said articulating joint.

2. An articulating vehicle having a locking link for locking an articulating joint of the vehicle as set forth in claim 1 wherein said swingable end of said locking link defines an oblong opening to facilitate insertion of said pin and locking said articulating vehicle.

3. An articulating vehicle having a locking link for locking an articulating joint of said vehicle as set forth in claim 1 wherein said rest position defines a vertical position of said locking link and said locking link is carried on said one of said bogies of said articulating vehicle.

4. An articulating vehicle having a locking link for locking an articulating joint of the vehicle as set forth in claim 1 wherein the upper bearing of said articulating joint defines one of said spherical bearings, said third bearing pivotally connecting said articulating link to one of said bogies defines the other of said spherical bearings, said pin support and said pin mounting means positioning said locking link at substantially the same height as said articulating link.

5. An articulating vehicle having a locking link for locking an articulating joint of said vehicle as set forth in claim 1 wherein said pivotal joint pivotally connecting one end of said locking link on said one bogie of said vehicle includes a sleeve integrally mounted on said one bogie of said vehicle.

6. An articulating vehicle having a locking link for locking an articulating joint of the vehicle as set forth in claim 1 wherein said bogies of said locking vehicle each define longitudinal axes coincidental with each when said bogies of said vehicle are aligned in the straight-ahead position, thereby aligning said pin mounting means opening and said hole in the swingable end of said link for locking said articulating joint of said vehicle.

7. An articulating vehicle having a locking link for locking an articulating joint of said vehicle as set forth in claim 1 including means pivotally mounting said locking link on the side of said one bogie of said vehicle, said bogies defining longitudinal center planes, said pivotal joint defining a pivotal axis normal to the longitudinal center planes of said bogies of said vehicle, said pin mounting means defining a second axis parallel with the axis of said pivotal joint normal to the longitudinal center planes of said bogies of said vehicle when said articulating joint is locked.

8. An articulating vehicle having a locking link for locking an articulated joint of an articulating vehicle as set forth in claim 1, including at least one hydraulic steering cylinder pivotally connected between said bogies of said vehicle adapted for steering said vehicle hydraulically.

9. An articulating vehicle having a locking link for locking an articulating joint of an articulating vehicle as set forth in claim 1 wherein said pin mounting means includes a clevis mounted on a plate, said plate providing support and vertical alignment of said hole of said swingable end of said locking link with said pin mounting means to facilitate horizontal alignment for locking said locking link.

* * * * *

UNITED STATES PATENT OFFICE
CERTIFICATE OF CORRECTION

Patent No. 4,116,459          Dated September 26, 1978

Inventor(s) Ernest A. Kreitzberg

It is certified that error appears in the above-identified patent and that said Letters Patent are hereby corrected as shown below:

Column 4, line 47, "said locking vehicle" should read ---said vehicle---; line 52, "said link for locking" should read ---said locking link for---.

Signed and Sealed this

*Thirteenth* Day of *March 1979*

[SEAL]

*Attest:*

RUTH C. MASON
*Attesting Officer*

DONALD W. BANNER
*Commissioner of Patents and Trademarks*